T. J. MAYALL.
Apparatus for Mixing Vulcanizable Compounds of Rubber, &c.

No. 144,998.  Patented Nov. 25, 1873.

UNITED STATES PATENT OFFICE.

THOMAS J. MAYALL, OF BOSTON, MASSACHUSETTS.

IMPROVEMENT IN APPARATUS FOR MIXING VULCANIZABLE COMPOUNDS OF RUBBER, &c.

Specification forming part of Letters Patent No. 144,998, dated November 25, 1873; application filed October 29, 1873.

*To all whom it may concern:*

Be it known that I, THOMAS J. MAYALL, of Boston, Suffolk county, Massachusetts, have invented certain new and useful Improvements in Apparatus for Mixing Vulcanizable Compounds of Rubber or Gutta-Percha, of which the following is a specification:

My invention relates to the construction of what is usually termed in rubber manufacture the "devil"—that is to say, the apparatus in which the sulphur, rubber, and other ingredients, such as emery, fiber, &c., are designed to be mixed thoroughly and intimately preparatory to the after processes required, in order to produce a vulcanized article of the kind required.

It has been my object to improve the construction of this apparatus, so that the mixing operation may not only consume less time, but also may be performed more effectually and thoroughly than has been practicable in apparatus heretofore used for the purpose in this manufacture.

The nature of my invention, and the manner in which the same is or may be carried into effect, will be understood by reference to the accompanying drawings, in which—

Figure 1:
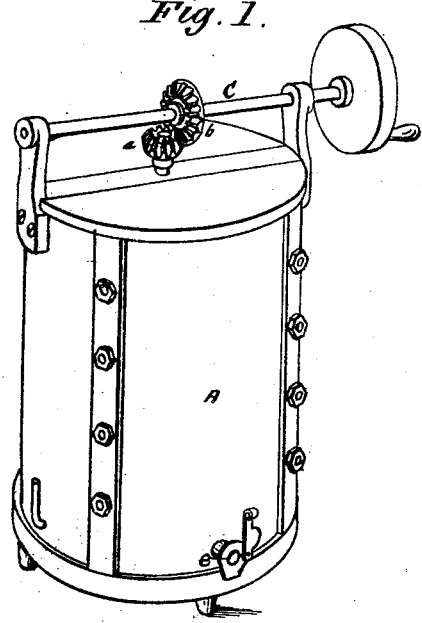
Figure 2:
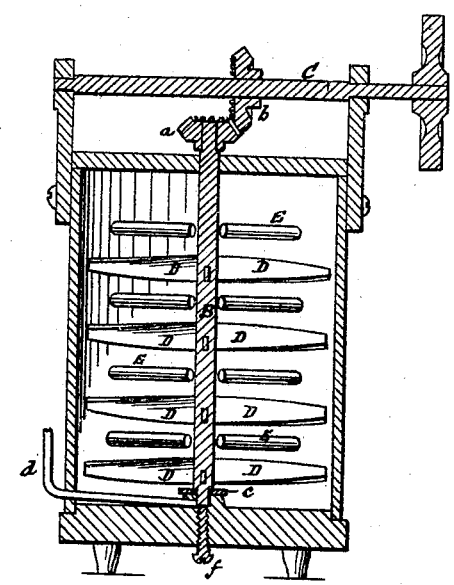
Figure 3:
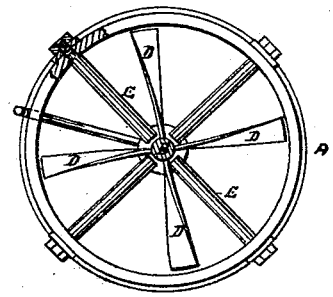

Figure 1 is a perspective view, Fig. 2 a vertical central section, and Fig. 3 a horizontal section, of a devil constructed in accordance with my invention.

A is the upright tank or receptacle, of cylindrical form and of suitable capacity. Centrally or axially within it is the upright revolving shaft B, stepped in the bottom of the tank, and supported, near its upper end, in a suitable bearing formed in a cross-piece supported, in this instance, on the top of the tank. The upper end of the shaft is provided with a beveled gear, $a$, meshing with a like gear, $b$, on driving-shaft C, which is revolved by suitable power, to cause the rotation of shaft B. Fixed to and radiating from the latter shaft are blades D, which are inclined or twisted, as shown clearly in Figs. 2 and 3, so that in their rotation they will tend to lift the stock up from the bottom of the tank. Immediately above each set of radial revolving blades are stationary arms E, fixed to the tank, and projecting inwardly nearly to the shaft B. These arms operate, in conjunction with the revolving inclined blades, to thoroughly work the plastic mass within the tank. The shaft B, at the point where it enters the step at the bottom of the tank, is provided with a rubber washer, $c$, which covers the step or bearing, and prevents entrance thereto of the emery or other ingredients mixed with the stock, which would tend to wear or grind the journal of the shaft and the bearing. A small pipe, $d$, leading from the exterior of the tank to the bearing, affords the means whereby the latter can be lubricated; and at the bottom of the tank is an opening, $e$, of proper size, (closed normally by a suitable valve or gate,) through which the stock, after having been mixed and brought to proper consistency and condition, can be drawn off. The lower end of the shaft B rests on a vertically-adjustable pin or screw, $f$, which can be set up to compensate for any wear of the shaft. A removable cover is usually provided for the tank, as indicated in Fig. 1 of the drawings.

The operation of the apparatus is as follows: The crude rubber, suitably thinned, the sulphur, and the emery or other ingredients usually employed, according to the nature and kind of article for which the compound is desired, having been put into the tank in the proper proportions, the tank is closed and the shaft B set in motion. The blades C D, in their revolution, not only stir up the mass, but also tend to lift it from the bottom, thus raising up the sulphur, as well as the emery or other foreign ingredients, which, being heavier than the rubber, would otherwise naturally tend to collect and settle at the bottom. All the constituents of the mass are thus evenly mixed, and the compound is made of the same consistency throughout. The arms E aid also materially in the operation, the stock being squeezed and mashed between the blades D of each set and the arms E, arranged immediately over said blades. The operation in this way can be conducted with much greater economy of time than heretofore practicable, and with a better and more certain result, the stock being of equal consistency throughout, and the sulphur, as well as other ingredients, (if any be used,) being evenly distributed through the mass, which is a matter of vital importance in the manufacture of vulcanized rubber and rubber compounds.

Having described my invention, and the manner in which the same is or may be carried into effect, what I claim as an improvement in apparatus for mixing and working vulcanizable rubber compounds is—

The combination, with the mixing-tank and the upright rotary shaft therein, of the radial inclined blade carried by said shaft, and the stationary arms projecting inwardly from the sides of the tank, and operating, in conjunction with said revolving radial inclined blades, substantially as shown and set forth.

In testimony whereof I have hereunto signed my name this 25th day of October, 1873.

THOS. J. MAYALL.

Witnesses:
A. POLLOK,
M. BAILEY.